Patented May 24, 1949

2,470,872

UNITED STATES PATENT OFFICE 2,470,872

PREPARATION OF ACID ACTIVATED CLAY

Robert B. Secor, South Gate, Calif., assignor to Filtrol Corporation, Los Angeles, Calif., a corporation of Delaware No Drawing. Application November 14, 1946, Serial No. 709,778

7 Claims. (Cl. 252—450)

This invention relates to the acid activation of sub-bentonite clays. More particularly it relates to the acid treatment of sub-bentonite clays to produce cracking catalysts especially well adapted for use in fluid catalytic cracking processes.

It is well known that certain natural clays, particularly the sub-bentonites, can be treated with mineral acids, particularly sulfuric acid, to produce efficient bleaching earths and active catalytic materials.

Sub-bentonites are a group of the bentonite clays the chief mineral constituent of which is montmorillonite. The sub-bentonites are relatively non-swelling in water as distinguished from the Wyoming type bentonite which is the swelling type. Moreover, the sub-bentonites are acid activatable to produce decolorizing material and cracking catalysts, and have predominantly magnesium and calcium base exchangeable ions, as distinguished from the Wyoming type bentonite having sodium as the predominant base exchangeable ion.

In many of the operations involving the use of such activated clays the particle size and hardness of the material plays an important role. This is especially true when the activated clay is used as a catalyst in the fluid catalytic cracking process for cracking petroleum hydrocarbons to make gasoline. In such a process the solid catalyst is handled as a fine powder and is suspended in a stream of the hydrocarbon vapors which are to be contacted. The solid material is maintained in a freely flowing condition at all times and can thus be handled in much the same way as a fluid. Therefore, the name "fluid" has been used to designate the process and the catalyst powder used is commonly referred to as a "fluid catalyst." The fluidizing properties of the solid catalyst or, in other words, the ability to be suspended in the gas stream, depends upon the size and density of the particles and distribution of particle size for any velocity and density of gas stream. The larger particles must be fine enough to be easily suspended in a moving stream of gas. Although the upper limit may be varied to a considerable extent depending upon the velocity and density of the gas stream, practical operating conditions have shown that the maximum size limit should not exceed about 150 microns in equivalent diameter for activated clay fluid catalyst. On the other hand, the catalyst should not contain particles that are too fine. Catalyst particles entrained in the effluent vapors from the contacting zone are separated from the gases in cyclone separators and electrical precipitators, such as Cottrell precipitators. These separating devices are able to effectively remove particles greater than about 10 to 20 microns in equivalent diameter and considerable quantities of material finer than this are lost from the system. Therefore, a good fluid catalyst should contain a minimum amount of particles finer than about 20 microns. Experience has shown, however, that a small amount of material in the range of 0 to 20 microns is effective in promoting the fluidizing properties of catalyst powder even though such fine material is gradually lost from the system, and so a small amount of such fines is advantageous.

Practical considerations have shown that a fluid catalyst should have all of its particles substantially finer than 150 microns and not more than 20% of its weight made up of particles finer than 20 microns. Moreover, the solid catalyst particles should be sufficiently hard to withstand breakdown and excessive attrition losses during use in the fluid cracking units.

In the customary acid activation processes, raw clay, after a preliminary crushing or grinding, is mixed with water or a dilute solution of water and acid to form a slurry to which an appropriate amount of sulfuric acid is then added. Ordinarily the acid dosage, that is, the per cent $H_2SO_4$ based on the volatile free (to constant weight at 1700° F.) raw clay, is about 35 to 40% and the initial concentration, that is, the per cent $H_2SO_4$ based on total water present in the treat (water added plus water in clay) is about 5 to 20%. The clay-acid slurry is then digested at a temperature of about 200° F. for a period of about 5 to 6 hours or more, and then washed in an appropriate system until substantially free of salts and residual acid. The washed product is filtered, dried, ground, and, if necessary separated.

Known processes of this type have the disadvantage of producing a large quantity of finely dispersed material some of which is unavoidably lost in the washing and separating steps. Moreover, the dried product is only loosely aggregated and during grinding or crushing is rather easily pulverized into very fine powder. Usually more than half of the ground material is too fine to be used as a fluid catalyst. The yield of fluid catalyst from this material varies between only 25 and 50%.

It is an object of this invention to prepare an activated sub-bentonite clay material composed of a large percentage of stable and attrition resistant particles especially suitable for use as a fluid catalyst.

It is another object of this invention to produce acid activated sub-bentonite clay material composed of particles of suitable size for fluid catalyst which are tougher and more resistant to attrition loss during use in a fluid catalytic cracking unit.

Another object of this invention is to produce a moderately coarse and water stable activated clay which can be quickly and easily washed by percolation or by repeated decantation without appreciable loss of fines.

Another object of this invention is to prepare the clay in such a manner that the above benefits can be obtained over a wide range of acid dosages and initial acid concentrations.

Other important objectives of this invention will be apparent from the accompanying disclosure.

It has been discovered that if in conjunction with a process for the acid activation of sub-bentonite clay to make decoloring material or cracking catalyst, especially for fluid catalytic cracking, the clay is compressed into forms or shapes, preferably substantially uniform in size and shape for the acid treatment, certain distinct advantages are obtained, as more particularly pointed out below.

One embodiment of the invention comprises extruding sub-bentonite clay with the proper moisture content (about 30–40% V. M.) through a die and cutting off the extruded strands to form small cylinders or pellets about 1/8 to 1/4 inch in diameter and about 1/4 to 3/8 inch in length. The extruded clay pellets are then contacted with acid, so that the concentration of the treat, preferably exceeds about 30% $H_2SO_4$, heated to 200 to 250° F. for one to several hours, or until the acid is substantially consumed, after which the excess acid and salts are removed by washing and filtering and the product finally dried, ground and separated to specifications.

The invention will be more readily understood from the following detailed description of the clay processing procedure.

Clay as it comes from the mine to be treated in accordance with the invention is crushed, ground and worked in a pug mill to a uniform mixture as desired for extrusion. It is then extruded under pressure to form compact and stable pellets. The moisture content of the raw clay should be adjusted to a fairly narrow range for effective operation of the extrusion apparatus and in order to obtain pellets of the desired density and stability. The moisture range for effective operation during pelleting may vary with the extrusion apparatus and the particular type of clay deposit but usually will be found to lie in the range of about 30 to 40% V. M. V. M. is defined as the total percentage of material, on the raw clay basis, removed from the clay by heating to constant weight at 1700° F.

The crushed and ground clay before extrusion is composed of rather finely divided soft aggregates and powder which appear as a solid material like ordinary earth. It is in a non-plastic state. This material can be compacted and pressed into small forms and shapes by various types of apparatus but it is preferable to force the clay through a die plate under high pressure to form compacted cylinders. The extruded clay is cut off so as to form cylinders of the desired length. The cylinders or pellets thus formed have a density of about 1.75 to 2.0 gms./cc. and are quite hard and stable. The unpelleted material has a particle density of about 1.5 to 1.65 gms./cc., but the particles are not hard and stable. In general, the compression into forms as by pelleting should preferably increase the density from a particle density to the density of the compressed forms, where each density is measured at the V. M. of the compacted of extruded material, at least about 7% and better results are obtained at above about 12%. Ordinarily, it will not be found practicable to increase the density more than about 25%. The pellets will not usually stick to each other and can be screened. It may be desirable to screen the extruded clay pellets on about a 7 mesh screen in order to reduce the quantity of any undesired fine clay and any broken or short pellets.

For extrusion apparatus the volatile matter content of the clay during extrusion should usually be below about 40% to enable increase of density by extrusion and to form sufficiently stable pellets, and usually must be above about 30% in order to plasticize properly under pressure. Usually with an Arizona sub-bentonite from the Cheto deposit, the V. M. for example, may be about 32 to 38% for the extrusion of satisfactory pellets.

The pellets may be immediately contacted with acid or they may be dried to a lower moisture content, that is, to a V. M. of from about 20 to 35%, before being contacted with the acid solution. However, in such drying, heating the pellets to a temperature exceeding about 250° F. so as to partially calcine them prior to the acid treatment should be avoided. The acid attack on over-dried or partially calcined pellets is measurably slower and the product of such an activation is markedly lower in decolorizing and catalytic efficiencies.

Any mineral acid or certain organic acids such as formic and oxalic may be used for the activation but sulfuric acid is preferred.

Measurable benefits from treating pellets with sulfuric acid at any concentration in the treat exceeding about 8% may be obtained but preferably the concentration of the contacting acid in the treat should exceed about 30%. As much as 85% of fluid catalyst has been obtained by treating pellets with sulfuric acid as compared with a yield of only 30 to 50% of fluid catalyst by the customary procedure of treating ground clay in the slurry form.

Clay pellets immersed and activated in sulfuric acid solutions about 35 to 40% or stronger surprisingly remain substantially whole and consequently can be washed free of salts and excess acid quickly and easily by a variety of methods such as decantation, percolation, or filtering. Therefore, it is preferable to use a moderately concentrated to concentrated solution of sulfuric acid in the treat for activating extruded or formed clay pellets.

In treating formed and compacted clay pellets with dilute acid solutions, about 25% or less, a considerable amount of fracturing takes place and in general the pellets do not retain their form. Under such conditions one would naturally expect the formed clay pellets to more or less completely slake down and form a clay slurry such as is obtained from natural clay aggregates and lumps. However, the surprising result is found that the formed clay material does not easily disperse into a slurry but tends to fracture and form small compacted aggregates which more or less maintain their compactness and size throughout the activation period and during washing. This results in distinct benefits during the washing because such material has a greater settling velocity and filtering rate than the slurry obtained from the customary activation procedure. Also the yield of fine granular material suitable for use as a fluid catalyst is appreciably higher.

The following examples illustrate more specifically the benefits involved in the acid activation of pelletized or compacted sub-bentonite clay aggregates as compared to ground and crushed clay.

In these examples the sub-bentonite was that obtained from the Cheto mine in Arizona and had the following analysis calculated on the voltatile free basis:

CHETO—V. F. BASIS

| | Percent |
|---|---|
| Silica (SiO₂) | 69.0 |
| Aluminum oxide (Al₂O₃) | 20.3 |
| Ferric oxide (Fe₂O₃) | 1.8 |
| Magnesium oxide (MgO) | 6.9 |
| Calcium oxide (CaO) | 2.6 |

The base exchange capacity of this Cheto sub-bentonite was found to be 130 milliequivalents per 100 grams calculated on the basis of volatile free sub-bentonite. The term "base exchange capacity" is expressed in milliequivalents per hundred grams of volatile free clay as determined by the test described by Bower and Truog in the Analytical Edition of Industrial and Engineering Chemistry, vol. 12, No. 7, page 411, July 15, 1940, in which the clay sample is exchanged with manganous ions and the latter released and measured colorimetrically.

The thermal dehydration curve of this sub-bentonite clay shows the usual endothermic peak for sub-bentonites at about 300 to 350° F., about 1200° F. to 1250° F. and about 1600° F. corresponding to the removal of adsorbed water, removal of lattice water or water of crystallization and disintegration of the montmorillonite structure, respectively. Also the thermal curve of this sub-bentonite shows substantially no endothermic peak due to an endothermic reaction at 950 F. to 1000° F.

EXAMPLE I

A sample of roll-crushed sub-bentonite from Arizona was treated with 40 dosage and 25% concentration of sulfuric acid at a temperature of 200° F. for six hours with gentle air and steam agitation. After acid treatment the slurry was quenched in cold water, washed and filtered until substantially free of salts and excess acid. A sample of the resulting filter cake was sieved under water being separated into the following size ranges in order to give a measure of its coarseness during activation and washing: +7 mesh, 7–20 mesh, 22–60 mesh, 60–100 mesh and through 100 mesh. The results are given in Table I. The bulk of the filter cake was then dried to a V. M. of about 20% and finally ground in a high speed cage mill. The size distribution of the resulting material is given in Table II so as to be easily compared to the other examples.

EXAMPLE II

A sample of the same sub-bentonite as in Example I was treated with 70 dosage and 40% concentration of sulfuric acid at a temperature of 220° F. for three hours with gentle agitation with air and steam. After acid treatment the material was subjected to the same operations as described in Example No. 1. The results are given in Tables I and II.

EXAMPLE III

A sample of roll-crushed sub-bentonite clay taken from the same stock pile as the two samples above, having a V. M. of 34% was extruded through 9/64 inch die orifice and cut off into cylinders about 3/16 inch in length. The compacted clay cylinders had a V. M. of 34% and a density of 1.8 gms./c. c., the particle density of the granules of the unpelleted material at the same V. M. of 34% had a density of 1.6 grams of cc. Hence, the increase in density at the V. M. of the compacted material, namely, 34% V. M. was from 1.6 to 1.8, an increase of 0.2 gram per cc. or 12.5%. A sample of the extruded clay pellets was then treated with 40 dosage and 25% concentration of sulfuric acid in the same manner as the roll-crushed clay in Example No. 1.

Some of the pellets remained substantially whole but some fractured somewhat into several pieces but did not disperse to form a slurry. The liquid could be readily poured from the substantially whole pellets and fractured pieces and contained only a slight amount of small particles.

EXAMPLE IV

A sample of the pelletized clay as prepared above in Example III was treated with 70 dosage and 40% concentration of sulfuric acid in a similar manner to the roll-crushed clay as described in Example II. The pellets remained substantially whole and appear to become hardened. Fracturing such as appeared in Example III was not observable.

The results obtained are shown below in Tables I and II.

Table I

[Size distribution of water stable particles in the various filter cakes after washing.]

| Example | +7 mesh | −7 and +20 mesh | −20 and +60 mesh | −60 and +100 mesh | −100 mesh |
|---|---|---|---|---|---|
| | Per cent | Per cent | Per cent | Per cent | Per cent |
| I | 1.0 | 14.0 | 13.0 | 9.0 | 63.0 |
| II | 7.5 | 28.0 | 25.0 | 4.5 | 34.0 |
| III | 16.0 | 33.0 | 26.0 | 6.0 | 19.0 |
| IV | 61.0 | 31.0 | 3.0 | 1.5 | 3.5 |

Table II

[Size fractions of particles in the total ground activated product from which a fluid catalyst is to be prepared.]

| Example No. | 0–20 microns | 20–150 microns | +150 microns |
|---|---|---|---|
| | Per cent | Per cent | Per cent |
| I | 52.3 | 44.5 | 3.2 |
| II | 49.2 | 44.4 | 4.8 |
| III | 37.5 | 59.7 | 2.8 |
| IV | 28.8 | 58.4 | 12.8 |

The results presented in Table I show the effects of pelleting upon maintaining a coarse clay material during activation and washing. The pellet clay material was effectively washed 2–3 times faster than the corresponding roll crushed clay. The effect of the stronger acid concentration and higher dosage is also brought out in this table. The acid of about 40% initial concentration apparently hardens the clay pellet so as to prevent decrepitation during the acid treatment. The hardening effect of the pellets persisted during washing although some small amount of decrepitation took place. However, finely dispersed clay was very low in the pelleted clay treated with 70 dosage and 40% concentration. The roll-crushed unpelleted clay is also definitely hardened and granulated by the stronger acid concentration but this is not as effective as pelleted clay in producing a granular activated material to facilitate washing. The amount of finely dispersed material is substantially higher for Example II as compared to Example III.

The results presented in Table II show that the total amount of finely divided particles is too large to give a satisfactory fluid catalyst so that a separation step is necessary. Each of these materials was separated in a whizzer separator and the yield and particle size distribution of the fluid catalyst obtained is given in Table III.

Table III

| Example No. | Yield | Size Distribution | | |
|---|---|---|---|---|
| | | 0-20 microns | 20-150 microns | +150 microns |
| | Per cent | | | |
| I | 46 | 17.8 | 75.4 | 6.8 |
| II | 44 | 16.6 | 71.4 | 12.0 |
| III | 63 | 14.2 | 82.2 | 3.6 |
| IV | 71 | 10.9 | 73.9 | 15.2 |

The fluid catalyst obtained from each of the examples is quite satisfactory for use in fluid cracking units but the yields obtained are 15-25% higher from the pelleted clay material.

While I have described particular examples of my invention for the purpose of illustration, it should be understood that various modifications and adaptations thereof may be made without departing from the spirit of the invention as set forth in the appended claims.

I claim:

1. In a process of acid activating an acid activatable clay in which said clay is activated by treatment with acid, washed to remove soluble salts and any residual acid, and the clay is separated from water and dried, the improvement which comprises compressing the clay, prior to acid treatment, into relatively stable forms having increased density of at least 7% over the particles of said clay before such compressing.

2. Process as defined in claim 1 in which the density is increased from about 12% to about 25%.

3. Process as defined in claim 1 in which the density is increased from about 7% to about 25% and the density after compression is at least about 1.7 grams per cubic centimeter.

4. Process as defined in claim 1 in which said relatively stable forms are substantially retained with substantially no dispersion while being treated with acid.

5. In a process of acid activating an acid activatable clay in which said clay is treated with acid, washed to remove soluble salts and any excess acid, solution removed from the clay and the clay dried, the improvement which comprises pelleting said clay to increase its density at least 7% prior to treating the clay with acid.

6. Process of producing a fluidized cracking catalyst from sub-bentonite clay which comprises pelleting said clay into forms having increased density of at least 7% over unpelleted clay aggregates of similar size, acid activating the pelleted clay by reaction with acid, washing, separating, and drying and grinding the finished material producing a product within a particle size range of 20 to 150 microns equivalent diameter and containing only a minor proportion of material having an equivalent diameter less than 20 microns.

7. In a process of acid activating a sub-bentonite clay in which the clay is treated with sulfuric acid, washed to remove soluble salts and residual acid and dried, the improvement which comprises compressing said clay into forms having increased density of at least 7% over the particles of said clay before such compressing, prior to the acid treatment.

ROBERT B. SECOR.

REFERENCES CITED

The following references are of record in the file of this patent:

UNITED STATES PATENTS

| Number | Name | Date |
|---|---|---|
| 2,403,753 | Pierce et al. | July 9, 1946 |